United States Patent
Dorum

(10) Patent No.: US 10,801,860 B2
(45) Date of Patent: Oct. 13, 2020

(54) MAPPING SYSTEM AND METHOD FOR IDENTIFYING A PARKING LOT FROM PROBE DATA

(71) Applicant: HERE Global B.V., Eindhoven (NL)

(72) Inventor: Ole Henry Dorum, Chicago, IL (US)

(73) Assignee: HERE GLOBAL B.V., Eindhoven (NL)

(*) Notice: Subject to any disclaimer, the term of this patent is extended or adjusted under 35 U.S.C. 154(b) by 0 days.

(21) Appl. No.: 15/622,155

(22) Filed: Jun. 14, 2017

(65) Prior Publication Data
US 2018/0364063 A1    Dec. 20, 2018

(51) Int. Cl.
| | |
|---|---|
| G01C 21/36 | (2006.01) |
| G01C 21/32 | (2006.01) |
| G09B 29/10 | (2006.01) |
| G08G 1/14 | (2006.01) |
| G08G 1/01 | (2006.01) |
| G01S 19/51 | (2010.01) |

(52) U.S. Cl.
CPC ......... *G01C 21/3685* (2013.01); *G01C 21/32* (2013.01); *G08G 1/0112* (2013.01); *G08G 1/14* (2013.01); *G08G 1/147* (2013.01); *G09B 29/106* (2013.01); *G01C 21/3679* (2013.01); *G01S 19/51* (2013.01)

(58) Field of Classification Search
CPC ................ G01C 21/3685; G01C 21/32; G01C 21/3679; G08G 1/147; G08G 1/14; G08G 1/0112; G09B 29/106; G01S 19/51
See application file for complete search history.

(56) References Cited

U.S. PATENT DOCUMENTS

| | | |
|---|---|---|
| 9,355,063 B2 | 5/2016 | Scharmann et al. |
| 9,478,134 B2 | 10/2016 | Narayanan et al. |

(Continued)

FOREIGN PATENT DOCUMENTS

| | | |
|---|---|---|
| TW | 2012/09767 | 3/2012 |
| WO | WO 2016/071512 A1 | 5/2016 |

OTHER PUBLICATIONS

Jacob, M. et al., *Efficient Energies and Algorithms for Parametric Snakes*, IEEE Transactions on Image Processing, vol. 13, No. 9 (Sep. 2004) 1231-1244.

(Continued)

*Primary Examiner* — Michael V Kerrigan
(74) *Attorney, Agent, or Firm* — Alston & Bird LLP

(57) ABSTRACT

A mapping system, method and computer program product are provided to identify a parking lot from probe data. In the context of a mapping system, processing circuitry is configured to determine a parking likelihood for each grid cell based upon probe data points associated with the respective grid cells and to identify likely parking locations in instances in which the parking likelihood for a respective grid cell satisfies a predefined threshold. The processing circuitry is also configured to cluster likely parking locations to identify parking lot clusters and to determine the boundary of the parking lot pursuant to a deformable contour model which causes a polygon to expand from a respective parking lot cluster so as to represent the boundary of the parking lot. The processing circuitry is further configured to update a map to include the parking lot having the boundary determined pursuant to the deformable contour model.

20 Claims, 7 Drawing Sheets

(56) References Cited

U.S. PATENT DOCUMENTS

| | | |
|---|---|---|
| 2012/0078493 A1 | 3/2012 | Schunder et al. |
| 2013/0211699 A1* | 8/2013 | Scharmann ............ G01C 21/32 |
| | | 701/117 |
| 2015/0051833 A1 | 2/2015 | Geelen |
| 2015/0058133 A1 | 2/2015 | Geelen |
| 2016/0225255 A1* | 8/2016 | Thakur ................ G08G 1/0112 |
| 2016/0239983 A1 | 8/2016 | Dorum et al. |
| 2016/0364985 A1 | 12/2016 | Penna et al. |

OTHER PUBLICATIONS

Yang, B. et al., *iPark: Identifying Parking Spaces from Trajectories*, ACM 978 (2013) Retrieved from the Internet: <URL: https://openproceedings.org/2013/conf/edbt/0002FJ13.pdf>. 705-708.

U.S. Appl. No. 15/449,145, filed Mar. 3, 2017, In re Dorum: *Method, Apparatus, And Computer Program Product For Parking Likelihood Estimation Based On Probe Data Collection*, 33 pages.

U.S. Appl. No. 15/449,142, filed Mar. 3, 2017, In re Dorum: *Method And Apparatus For Updating Road Map Geometry Based On Probe Data*, 40 pages.

Extended European Search Report for EP Application No. 18177781.4 dated Apr. 12, 2019, 6 pages.

\* cited by examiner

US 10,801,860 B2

MAPPING SYSTEM AND METHOD FOR IDENTIFYING A PARKING LOT FROM PROBE DATA

TECHNICAL FIELD

An example embodiment of the present disclosure relates generally to a mapping system and method and, more particularly, to a mapping system, method and computer program product for identifying a parking lot from probe data.

BACKGROUND

Mapping systems generate maps representative of roadways and other features, e.g., buildings, landmarks, lakes, parks, etc., that are utilized by navigation systems and referenced by drivers in order to facilitate the flow of traffic over the roadways. Among the features that are depicted by maps are parking lots that are accessible via the roads. As such, drivers can rely upon the maps generated by a mapping system in order to navigate to a particular parking lot, such as a parking lot near their destination.

Mapping systems have utilized various techniques for identifying a parking lot. For example, some mapping systems have conducted a trajectory analysis in which a parking lot was identified from probe data points representative of vehicular traffic that has trajectories indicating that the probe data point is leaving the road. Other mapping systems have utilized a stay point analysis in which probe data points that have stopped or otherwise exhibit a stay behavior for an extended period of time provide an indication that they vehicle has been parked. As such, mapping systems have been able to identify probe data points representative of vehicles that have parked. However, the mere identification that a vehicle has been parked does not define the shape or boundary of the parking lot, which is desirable for purposes of appropriately depicting the parking lot upon a map and providing guidance for a driver.

BRIEF SUMMARY

A mapping system, method and computer program product are provided in accordance with an example embodiment in order to identify a parking lot from probe data. In this regard, the mapping system, method and computer program product of an example embodiment are configured to analyze probe data and to determine the boundary of a parking lot from the probe data, such as pursuant to a deformable contour model. As such, the mapping system, method and computer program product of an example embodiment are configured to update a map to include the parking lot having the boundary that has been determined pursuant to the deformable contour model. The resulting map may therefore more accurately reflect not only the location, but also the shape and size of a parking lot, thereby providing greater assistance in navigation including navigation to the parking lot.

In an example embodiment, a mapping system is provided for identifying a parking lot from probe data. The mapping system includes a memory configured to store the probe data comprised of a plurality of probe data points. Each probe data point is associated with a respective location. The mapping system also includes processing circuitry in communication with the memory and configured to associate the probe data points with respective grid cells based upon the location associated with each probe data point. The processing circuitry is also configured to determine a parking likelihood for each grid cell based upon the probe data points associated with the respective grid cells and to identify likely parking locations in instances in which the parking likelihood for a respective grid cell satisfies a predefined threshold. The processing circuitry is also configured to cluster likely parking locations to identify parking lot clusters. The processing circuitry is also configured to determine the boundary of the parking lot pursuant to a deformable contour model which causes a polygon to expand from a respective parking lot cluster so as to represent the boundary of the parking lot. The processing circuitry is further configured to update a map to include the parking lot having the boundary determined pursuant to the deformable contour model.

The processing circuitry of an example embodiment is further configured to merge parking lots having respective boundaries that overlap prior to updating the map. The processing circuitry of an example embodiment is configured to determine the boundary of the parking lot based upon an energy function. The energy function is comprised of an external energy function and an internal energy function. The internal energy function is based upon a bending energy and a tension energy determined from one or more boundary vertices, while the external energy function is based upon detection of the boundary of the parking lot, such as by being based upon a number of likely parking locations outside of the boundary within a predefined distance of the boundary.

The processing circuitry of an example embodiment is configured to determine the parking likelihood for a respective grid cell by determining a local heading direction of a road and then determining a probe heading driving density based upon a number of probe data points that are associated with the respective grid cell that have a heading within a first predefined range of the local heading direction of the road and that also have a speed that is at least as great as a predefined minimum speed. The processing circuitry of this example embodiment may be further configured to determine the parking likelihood for a respective grid cell by determining a probe heading parking density based upon a number of probe data points that are associated with a respective grid cell that have a heading within a second predefined range and that also have a speed that is no greater than a predefined maximum speed. The processing circuitry of this example embodiment may be further configured to determine the parking likelihood for a respective grid cell based upon a ratio of the probe heading parking density to a combination of the probe heading driving density and the probe heading parking density. The processing circuitry of this example embodiment may also be configured to determine the parking likelihood by: (i) determining a speed ratio of probe data points having a speed that is at least as great as a predefined minimum speed to a combination of probe data points having a speed that is at least as great as the predefined minimum speed and probe data points having a speed that is no more than a predefined maximum speed and (ii) setting the parking likelihood to a value that fails to satisfy the predefined threshold in an instance in which the speed ratio is less than the predetermined value.

In another example embodiment, a method is provided for identifying a parking lot from probe data comprised of a plurality of probe data points. The method includes associating probe data points with respective grid cells based upon a location associated with each probe data point. The method also determines a parking likelihood for each grid cell based upon the probe data points associated with the respective grid cells. The method further includes identifying likely parking locations in an instance in which the parking likelihood for a respective grid cell satisfies a predefined threshold. The method further includes clustering likely parking locations to identify parking lot clusters and determining, with processing circuitry of a mapping system, a boundary of the parking lot pursuant to a deformable contour model which causes a polygon to expand from a respective parking lot cluster to represent the boundary of the parking lot. The method further includes updating a map to include the parking lot having the boundary determined pursuant to the deformable contour model.

The method of an example embodiment also includes merging parking lots having respective boundaries that overlap prior to updating the map. The method of an example embodiment determines the boundary of the parking lot based upon an energy function comprised of an external energy function and an internal energy function. The internal energy function is based upon a bending energy and a tension energy determined from one or more boundary vertices, while the external energy function is based upon detection of the boundary of the parking lot, such as by being based upon a number of likely parking locations outside of the boundary within a predefined distance of the boundary.

The method of an example embodiment determines the parking likelihood for a respective grid cell by determining a local heading direction of a road and then determining a probe heading driving density based upon a number of probe data points that are associated with respective grid cells that have a heading within a first predefined range of the local heading direction of the road and that also have a speed that is at least as great as a predefined minimum speed. The method of this example embodiment determines the parking likelihood for a respective grid cell by determining a probe heading parking density based upon a number of probe data points that are associated with respective grid cells that have a heading within a second predefined range and that also have a speed that is no greater than a predefined maximum speed. The method of this example embodiment also determines the parking likelihood for a respective grid cell based upon a ratio of the probe heading parking density to a combination of the probe heading driving density and the probe heading parking density. The method of this example embodiment also determines the parking likelihood by: (i) determining a speed ratio of probe data points having a speed that is at least as great as a predefined minimum speed to a combination of probe data points having a speed that is at least as great as the predefined minimum speed and probe data points having a speed that is no more than a predefined maximum speed and (ii) setting the parking likelihood to a value that fails to satisfy the predefined threshold in an instance in which the speed ratio is less than a predetermined value.

In a further example embodiment, a computer program product is provided for identifying a parking lot from probe data comprised of a plurality of probe data points. The computer program product includes at least one non-transitory computer-readable storage medium having computer-executable program code portions stored therein. The computer-executable program code portions include program code instructions configured to associate probe data points with respective grid cells based upon a location associated with each probe data point. The computer-executable program code portions also include program code instructions configured to determine a parking likelihood for each grid cell based upon the probe data points associated with the respective grid cells and program code instructions configured to identify likely parking locations in instances in which the parking likelihood for a respective grid cell satisfies a predefined threshold. The computer-executable program code portions also include program code instructions configured to cluster likely parking locations to identify parking lot clusters and program code instructions configured to determine a boundary of the parking lot pursuant to a deformable contour model which causes a polygon to expand from a respective parking lot cluster to represent the boundary of the parking lot. The computer-executable program code portions further include program code instructions configured to update a map to include the parking lot having the boundary determined pursuant to the deformable contour model.

The computer-executable program code portions of an example embodiment also include program code instructions configured to merge parking lots having respective boundaries that overlap prior to updating the map. In an example embodiment, the program code instructions configured to determine the boundary of the parking lot include program code instructions configured to determine the boundary of the parking lot based upon an energy function comprised of an external energy function and an internal energy function. The internal energy function is based upon a bending energy and a tension energy determined from one or more boundary vertices, while the external energy function is based upon detection of the boundary of the parking lot, such as by being based upon a number of likely parking locations outside of the boundary within a predefined distance of the boundary.

In an example embodiment, the program code instructions configured to determine the parking likelihood for a respective grid cell include program code instructions configured to determine a local heading direction of a road and program code instructions configured to then determine a probe heading driving density based upon a number of probe data points that are associated with the respective grid cell that have a heading within a first predefined range of the local heading direction of the road and that also have a speed that is at least as great as a predefined minimum speed. In this example embodiment, the program code instructions configured to determine the parking likelihood for a respective grid cell may include program code instructions configured to determine a probe heading parking density based upon a number of probe data points that are associated with the respective grid cell that have a heading within a second predefined range and that also have a speed that is no greater than a predefined maximum speed. The program code instructions configured to determine the parking likelihood may also include program code instructions configured to: (i) determine a speed ratio of probe data points having a speed that is at least as great as a predefined minimum speed to a combination of probe data points having a speed that is at least as great as the predefined minimum speed and probe data points having a speed that is no more than a predefined maximum speed and (ii) set the parking likelihood to a value that fails to satisfy the predefined threshold in an instance in which the speed ratio is less than a predetermined value.

BRIEF DESCRIPTION OF THE DRAWINGS

Figure 1:
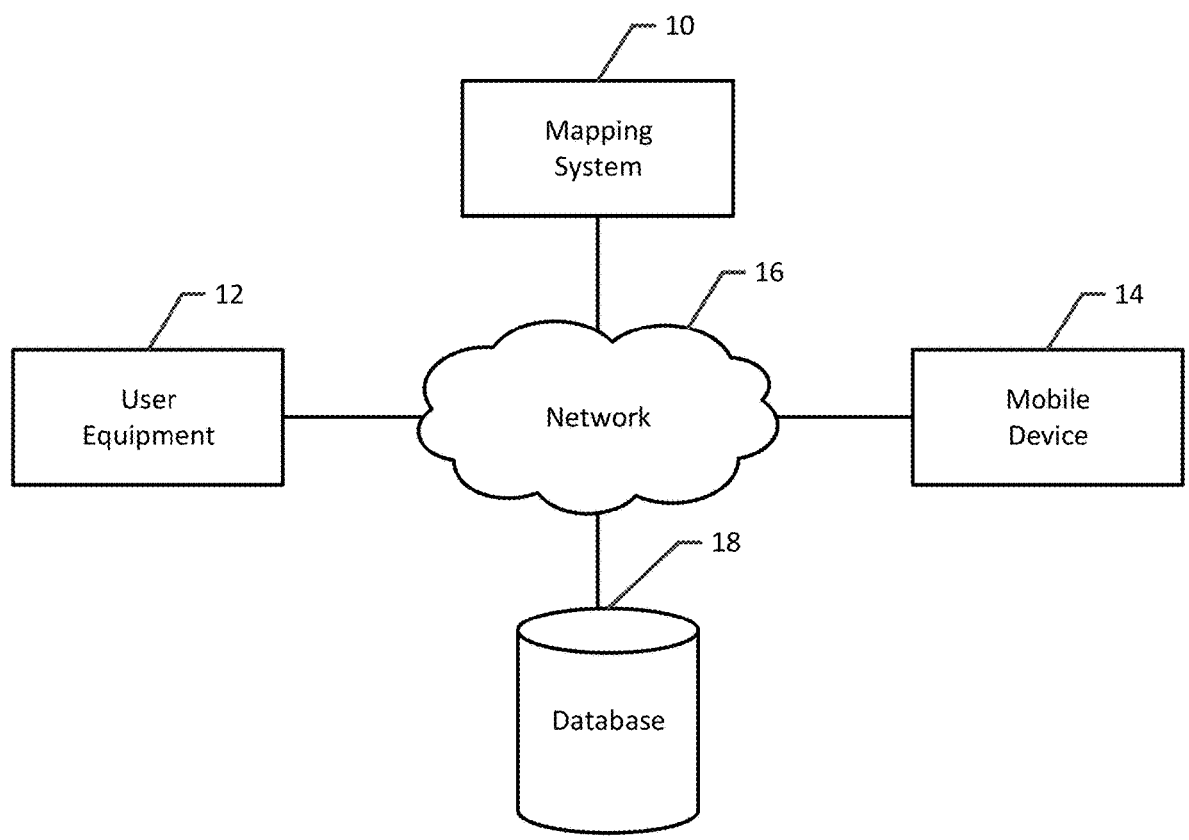
Figure 2:
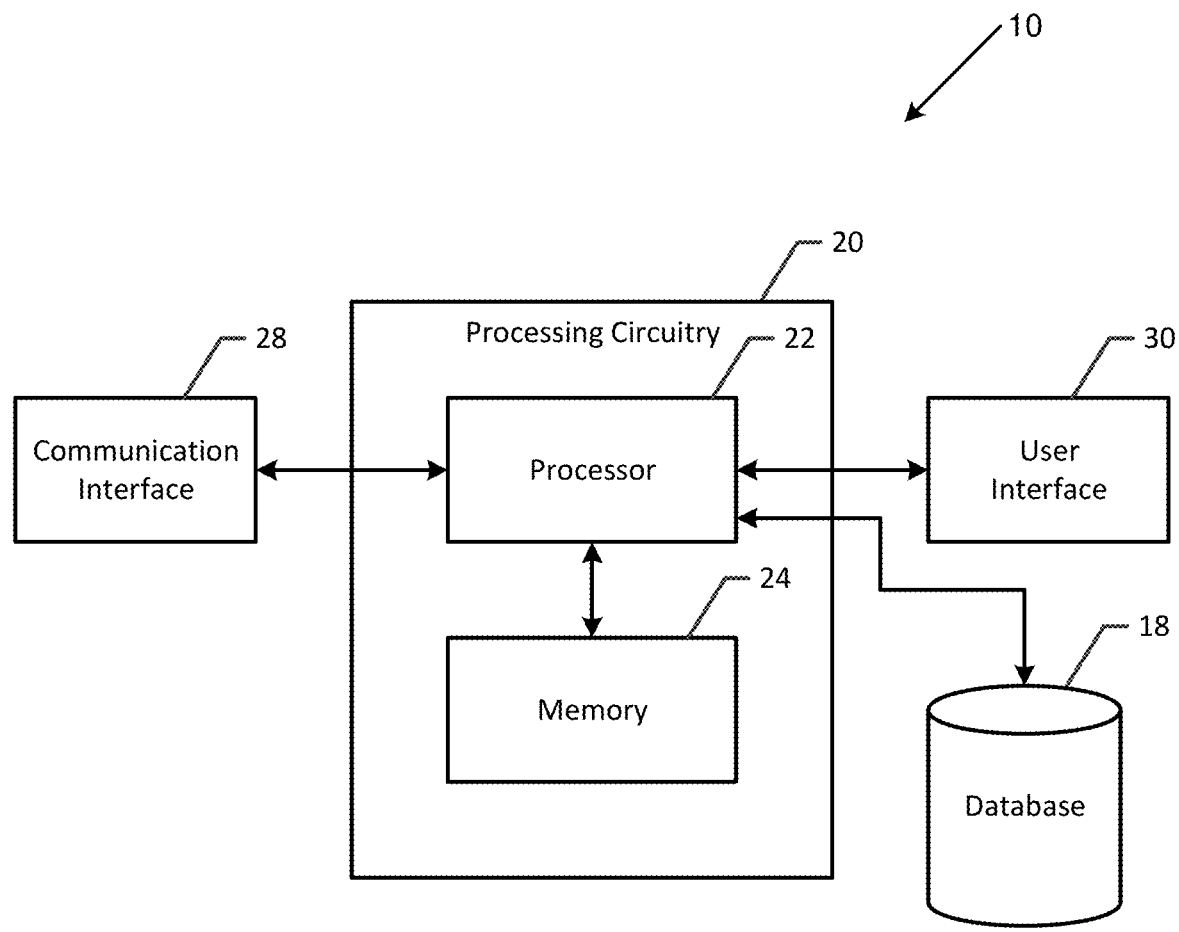
Figure 3:
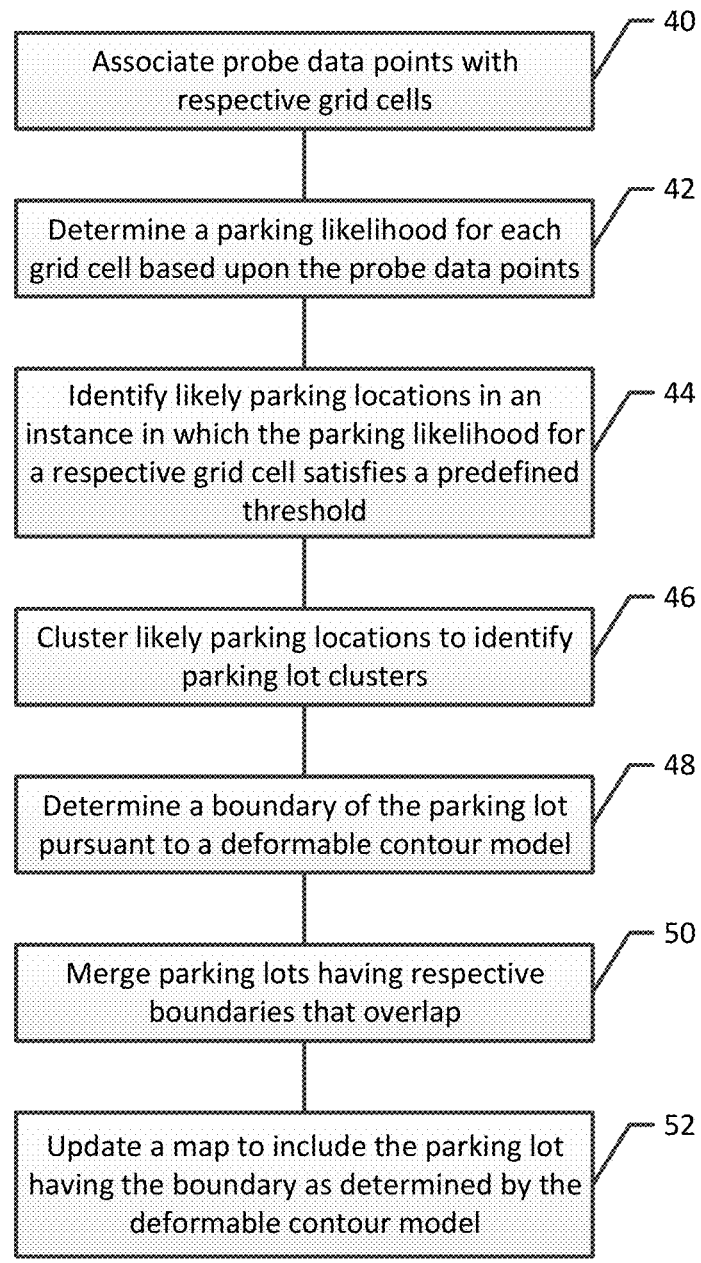
Figure 4:
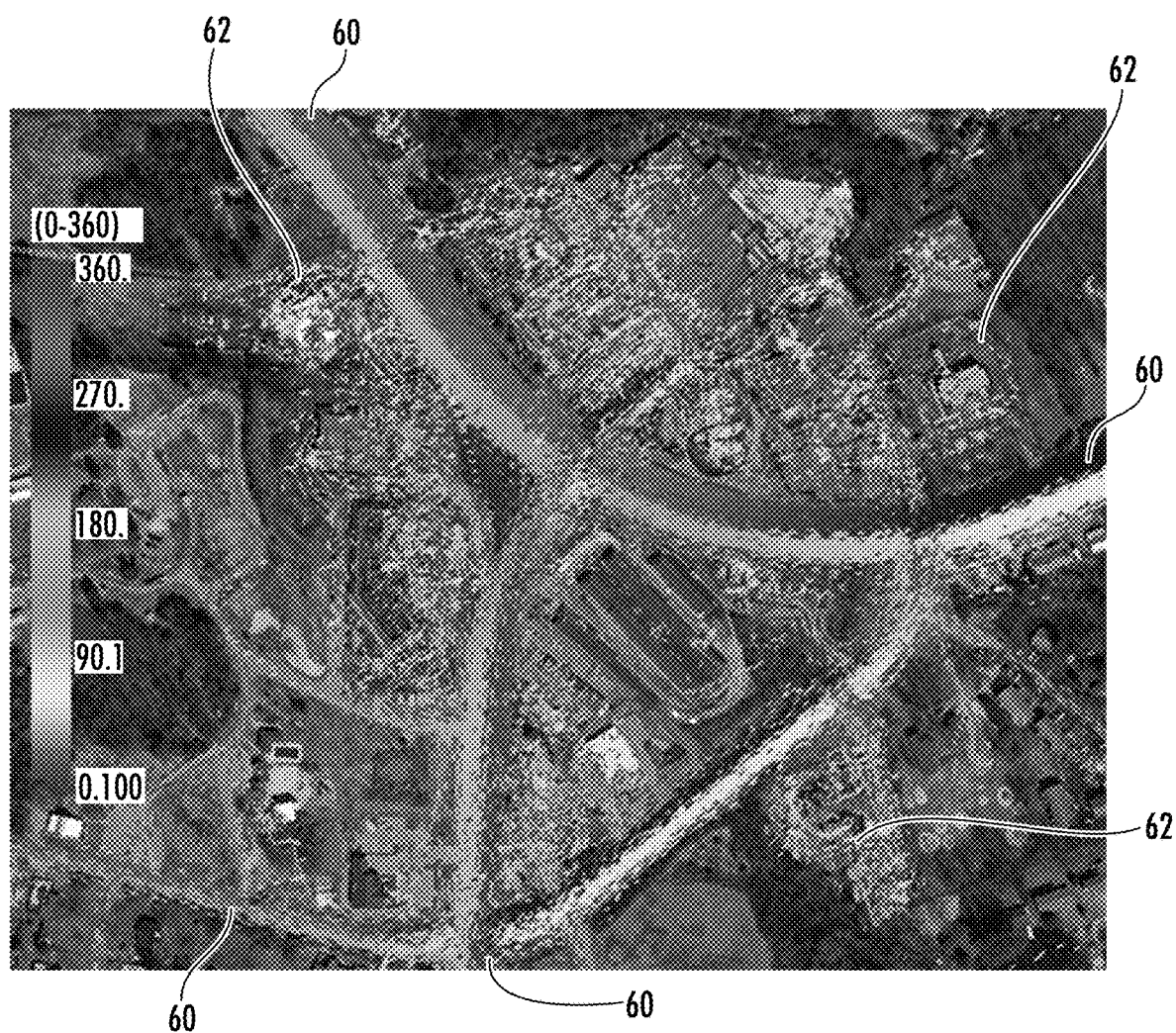
Figure 5:
Figure 6:
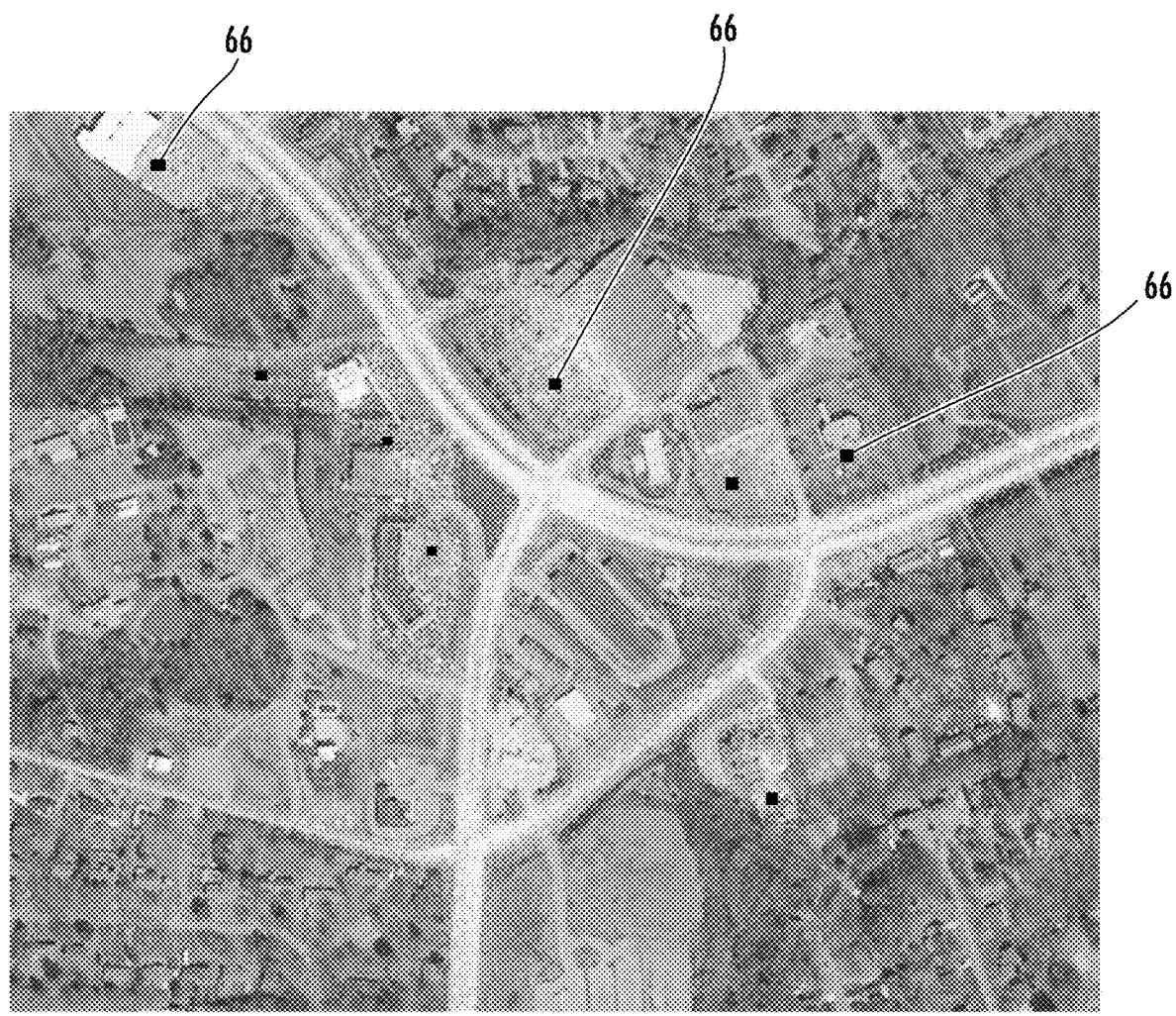
Figure 7:

Having thus described certain example embodiments of the present disclosure in general terms, reference will hereinafter be made to the accompanying drawings, which are not necessarily drawn to scale, and wherein:

FIG. 1 is a system diagram depicting a mapping system in communication with a plurality of user equipment, such as to receive probe data points and/or to provide a map constructed in accordance with an example embodiment of the present disclosure;

FIG. 2 is a block diagram of a mapping system in accordance with an example embodiment of the present disclosure;

FIG. 3 is a flowchart illustrating operations performed, such as by the mapping system of FIG. 2, in accordance with an example embodiment of the present disclosure;

FIG. 4 illustrates probe headings for a plurality of probe data points illustrating the chaotic distribution of probe headings in parking lots;

FIG. 5 illustrates a plurality of likely parking locations determined in accordance with an example embodiment of the present disclosure;

FIG. 6 illustrates a plurality of parking lot cluster centers determined in accordance with an example embodiment of the present disclosure; and FIG. 7 illustrates the boundaries of a plurality of parking lots determined pursuant to a deformable contour model in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), can be differentiated from a "computer-readable transmission medium," which refers to an electromagnetic signal.

A mapping system, method and computer program product are provided herein in accordance with an example embodiment for identifying a parking lot from probe data. In this regard, the mapping system, method and computer program product of an example embodiment are configured to analyze probe data and to determine the boundary of a parking lot from the probe data, such as pursuant to a deformable contour model. A map may thereafter be updated to include the parking lot having the boundary that has been determined pursuant to the deformable contour model. Once updated, the map will more accurately reflect the location, the shape and the size of the parking lot, thereby providing greater assistance in navigation including navigation to the parking lot.

In this regard, a system as illustrated in FIG. 1 provides for a map to be updated in order to depict the boundary of a parking lot. FIG. 1 illustrates a communication diagram of an example embodiment of a system for implementing an example embodiment described herein. The illustrated embodiment of FIG. 1 includes a mapping system 10 in data communication with user equipment (UE) 12 and/or a geographic map database, e.g., map database 18 through a network 16, and one or more mobile devices 14. The mobile device 14 may be associated, coupled, or otherwise integrated with a vehicle, such as in a vehicle's head unit, infotainment unit, or an advanced driver assistance system (ADAS), for example. Additional, different, or fewer components may be provided. For example, many mobile devices 14 may connect with the network 16. In addition, the map database 18 may be accessible via the network or may, alternatively, be included within or co-located with the mapping system 19. Further, the network may be wired, wireless, or any combination of wired and wireless communication networks, such as cellular, Wi-Fi, internet, local area networks, or the like.

The user equipment 12 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. The user equipment 12 may be configured to access the map database 18 via the mapping system 10 through, for example, a mapping application, such that the user equipment may provide navigation and map functions such as guidance and map display, for example, and for determination of one or more personalized routes or route segments based on one or more calculated and recorded routes, according to some example embodiments.

The map database 18 may include node data, road segment data or link data, point of interest (POI) data, or the like. The map database 18 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 18 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 18 can include data about the POIs and their respective locations in the POI records. The map database 18 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 18 can include event data (e.g., traffic incidents, construction activities, scheduled events, unscheduled events, etc.) associated with the POI data records or other records of the map database 18.

The map database 18 may be maintained by a content provider e.g., a map developer. By way of example, the map developer can collect geographic data to generate and enhance the map database 18. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 18 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 12, for example. Further, data may be compiled relating to the existence of parking lots along different road segments of the map database. The navigation-related functions can correspond to vehicle navigation, pedestrian navigation, or other types of navigation. While certain example embodiments described herein generally relate to vehicular travel and parking along roads, other example embodiments may be implemented for maritime navigational routes including the identification and outline of docks or other boat slips. The compilation to produce the end user databases can be performed by a party or entity separate from the mapping system 10. For example, a customer of the mapping system 10, such as a navigation device developer or other end user device developer, can perform compilation on a received map database in a delivery format to produce one or more compiled navigation databases.

As mentioned above, the map database 18 may be a master geographic database, but in alternate embodiments, the map database 18 may represent a compiled navigation database that may be used in or with end user devices (e.g., user equipment 12) to provide navigation and/or map-related functions. For example, the map database 18 may be used with the user equipment 12 to provide an end user with navigation features. In such a case, the map database 18 can be downloaded or stored on the end user device (user equipment 12) which can access the map database 18 through a wireless or wired connection, such as via the mapping system 10 and/or the network 16, for example.

The mapping system 10 may receive probe data, directly or indirectly (such as from a database in which the probe data is stored prior to access by the mapping system), from a mobile device 14. The mobile device 14 may include one or more detectors or sensors, such as a positioning system built or embedded into or within the mobile device. Alternatively, the mobile device 14 may use communications signals for position determination. The mobile device 14 may receive location data from a positioning system, such as a global positioning system (GPS), cellular tower location methods, access point communication fingerprinting, or the like. The mapping system 10 may receive sensor data configured to describe a position of a mobile device 14, or a controller of the mobile device may receive the sensor data from the positioning system of the mobile device. The mobile device 14 may also include a system for tracking mobile device movement, such as rotation, velocity, acceleration, heading, etc. Movement information may also be determined using the positioning system. The mobile device 14 may use the detectors and sensors to provide vehicle data indicating a location of a vehicle. This vehicle data, also referred to herein as "probe data", may be collected by any device capable of determining the necessary information, and providing the necessary information to the mapping system 10 or a database accessible to the mapping system. The mobile device 14 is one example of a device that can function as a probe to collect probe data of a vehicle.

More specifically, probe data (e.g., collected by mobile device 14) may be representative of the location of a vehicle at a respective point in time and may be collected while a vehicle is traveling along a route. While probe data is described herein as being vehicle probe data, other example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. Although additional data may be included with the probe data, such as vehicle identification, environmental conditions, or the like; for purposes of the mapping system 10 of an example embodiment, the probe data may at least include location, heading, speed, and time, while other data may be superfluous. The time associated with probe data may include date and time, while the GPS location may include coordinates, such as longitude and latitude of the location. The heading may include a compass direction or a degree heading, while the speed may be any unit of measure of the speed of the probe. The probe data may include a plurality of probe data points and, in one embodiment, may be in the form of an ordered list of GPS locations where the vehicle has traveled and a time associated with each GPS location. The mobile device 14, may be any device capable of collecting the aforementioned probe data. Some examples of the mobile device 14 may include specialized vehicle mapping equipment, navigational systems, mobile devices, such as phones or personal data assistants, or the like.

An example embodiment of a mapping system 10 is illustrated in FIG. 2. The mapping system, such as that shown in FIG. 2, may be specifically configured in accordance with an example embodiment for identifying parking lots from probe data and for updating a map to provide an outline of the parking lots that have been identified. The mapping system 10 may include or otherwise be in communication with processing circuitry 20 which may, in turn, include a processor 22 and, in some embodiments, a memory device 24. Alternatively, the memory device 24 may be external to, but in communication with the processing circuitry 20. The mapping system 10 of an example embodiment also includes a communication interface 28 and a user interface 30. Although the map database 18 may be remote from the mapping system 10 and accessible via the network 16 as shown in FIG. 1, the mapping system of another embodiment depicted in FIG. 2 may also include the map database 18.

In some embodiments, the processor 22 (and/or co-processors or any other circuitry assisting or otherwise associated with the processor) may be in communication with the memory device 24 via a bus for passing information among components of the apparatus. The memory device 24 may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 22). The memory device 24 may be configured to store information, data, content, applications, instructions, or the like, for enabling the apparatus to carry out various functions in accordance with an example embodiment of the present invention. For example, the memory device 24 could be configured to buffer input data for processing by the processor 22. Additionally or alternatively, the memory device 24 could be configured to store instructions for execution by the processor 22.

The processor 22 may be embodied in a number of different ways. For example, the processor 22 may be embodied as one or more of various hardware processing circuits such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 22 is configured to execute instructions stored in the memory device 24 or otherwise accessible to the processor. Alternatively or additionally, the processor 22 may be configured to execute hard coded functionality. As such, whether configured by hardware or software methods, or by a combination thereof, the processor 22 may represent an entity (for example, physically embodied in circuitry) capable of performing operations according to an embodiment of the present invention while configured accordingly. Thus, for example, when the processor 22 is embodied as an ASIC, FPGA or the like, the processor may be specifically configured hardware for conducting the operations described herein. Alternatively, as another example, when the processor 22 is embodied as an executor of software instructions, the instructions may specifically configure the processor to perform the algorithms and/or operations described herein when the instructions are executed. The processing circuitry 20, such as the processor 22, may include, among other things, a clock, an arithmetic logic unit (ALU) and logic gates configured to support operation of the processor.

The mapping system 10 of an example embodiment may also include a communication interface 28 that may be any means such as a device or circuitry embodied in either hardware or a combination of hardware and software that is configured to receive and/or transmit data to/from a communications device in communication with the mapping system, such as to facilitate communications with one or more user equipment 12 or the like. In this regard, the communication interface 28 may include, for example, an antenna (or multiple antennae) and supporting hardware and/or software for enabling communications with a wireless communication network. Additionally or alternatively, the communication interface 28 may include the circuitry for interacting with the antenna(s) to cause transmission of signals via the antenna(s) or to handle receipt of signals received via the antenna(s). In some environments, the communication interface 28 may alternatively or also support wired communication. As such, for example, the communication interface 28 may include a communication modem and/or other hardware and/or software for supporting communication via cable, digital subscriber line (DSL), universal serial bus (USB) or other mechanisms.

The mapping system 10 may also optionally include a user interface 30 that may, in turn, be in communication with the processing circuitry 20 to provide output to the user and, in some embodiments, to receive an indication of a user input. As such, the user interface 30 may include a display and, in some embodiments, may also include a keyboard, a mouse, a joystick, a touch screen, touch areas, soft keys, one or more microphones, a plurality of speakers, or other input/output mechanisms. In one embodiment, the processing circuitry 20 may comprise user interface circuitry configured to control at least some functions of one or more user interface elements such as a display and, in some embodiments, a plurality of speakers, a ringer, one or more microphones and/or the like. The processing circuitry 20 and/or user interface circuitry may be configured to control one or more functions of one or more user interface elements through computer program instructions (for example, software and/or firmware) stored on a memory accessible to the processing circuitry (for example, memory device 24, and/or the like).

The mapping system 10 and method are configured to identify parking lots from probe data and to updated maps as to include the parking lots and, in particular, representations of the boundaries of the parking lots. As such, the map may more accurately represent the parking lots and users of a navigation system that relies upon the map may be provided with more accurate information regarding their parking options. The operations performed by the mapping system 10 of an example embodiment are depicted in FIG. 3. As shown in block 40 of FIG. 3, the mapping system 10 includes means, such as the processing circuitry 20, the processor 22 or the like, configured to associate probe data points with respective grid cells. Probe data points may be provided by mobile devices 14 as described above. The probe data points may be provided directly to the mapping system 10, such as the processing circuitry 20, the processor 22 or the like. Alternatively, the probe data points may be stored, such as by map database 18, memory 24 or the like, and subsequently accessed by the processing circuitry 20, e.g., the processor 22. With respect to the grid cells, the probe data may be divided into a plurality of grid cells, each having a predetermined size and shape, such as a square shape with a side of a predetermined length, such as 5 meters, 10 meters of the like. Thus, each of the probe data points is associated with a respective grid cell with each probe data point having a location that falls within a respective grid cell being associated therewith.

As shown in block 42 of FIG. 3, a mapping system 10 also includes means, such as the processing circuitry 20, the processor 22 or the like, configured to determine the parking likelihood (c) for each grid cell based upon the probe data points. The parking likelihood GO may be calculated using probe data including probe heading density. Probe heading density for a location may be defined as: $n = HD(R, \vec{p}_i, \vec{p}, \theta, v_{min}, v_{max})$, where n is the number of probe data points within a search radius R of the location having heading vector $\vec{p}_i$ that lies within some threshold angle θ with respect to reference heading vector $\vec{p}$, subject to a specified speed range $\{v_{min}, v_{max}\}$. The probe heading density thus gathers the probes that are within a predefined area, having approximately the same heading as a reference heading (e.g., a local heading of a road segment or parking lot parking lane at the location), that are above a minimum speed, and optionally below a maximum speed.

Based upon the above described definition of a heading density, distinctions may be made between heading types—either probe heading driving density or probe heading parking density—to enable calculation of a parking likelihood. A driving probe may be distinguished from a parking probe based on one or more factors. For example, a driving probe is likely to have probe data information with a heading that corresponds, within a certain degree of error, to the heading of a local road segment driving direction. A probe having probe data heading information with a heading that does not correspond to a local road segment driving direction is quite possibly parked, or in the process of parking (e.g., performing a parking maneuver). Additionally, probe data speed may be used to aid in distinguishing a parking vehicle from a driving vehicle. Speeds above a predefined threshold may be established as not parked or performing parking maneuvers. For example, a vehicle traveling at 20 kilometers per hour is likely not in the process of parking. Conversely, a vehicle that is traveling at a low speed, which may be below a second, different threshold or the same threshold, may be considered likely to be parking or parked, provided their heading does not align with that of a local road segment (which may indicate slow traffic).

According to an example embodiment, parking likelihood along roads or for point locations may be determined based on probe heading data. The likelihood measures the chaotic orientation of the heading vectors in parking lots as compared to roadways where heading vectors are expected almost exclusively parallel to the local roadway segment direction of travel. FIG. 4, which is presented in gray scale to indicate the probe heading data interpretation, shows traffic probe data. The direction of the probe data heading is shown in gray scale based on a compass direction from 0.10 to 360 degrees. The legend on the left of the figure illustrates the heading direction in degrees, while the probe data points are within the region depicted by the map. As shown, vehicles traveling along roadways 60 generally have the same heading according to their probe data, as illustrated by the relatively homogeneous shade of the probe data points along the major roadways. Conversely, the chaotic orientation of the probe data point heading vectors in parking lots 62 do not have a homogeneous appearance and appear more closely with the chaotic nature of vehicle headings experienced in parking lots.

Probe heading density, specifically probe heading driving density, is a metric that may indicate the amount of probe data points with compatible heading (e.g., within some heading angle threshold with respect to the road heading $\gamma^x$). To determine the local heading direction of a road segment from probe data and a driving direction thereof, a Principal Component Analysis (PCA), which is a dimensional reduction technique may be used to derive the Principal Components (e.g., the local road segment tangent line). Other techniques may also be used, such as the Robust Statistics line fit technique known as the Least Median of Squares (LMS). However, both of these techniques are point based and do not require heading vector information. As such, in an instance in which the road tangent line is determined by PCA or LMS, a determination must also be made as to which direction of the tangent line corresponds to each driving direction in order to define the probe driving direction in each direction of travel.

The largest Principal Component $\gamma^x$ indicates the orientation of the majority of probe data points in that region and thus the local orientation of the road segment. While heading data is not necessary for the establishment of the Principal Component heading of segments of the roadways, an example embodiment takes advantage of probe data point heading information to determine the median probe heading vector to yield the road reference driving heading vector used to compute the heading density $HD_D$. Among other advantages, the median probe heading vector is statistically robust to noise as it is based on the median. The median heading direction is the road heading $\gamma^x$ which is used as the road reference heading vector $\vec{p}$ to compute the heading density $HD_D$ while driving. In this regard, the median probe heading vector may be computed by considering the x and y heading vector components separately. The median heading vector may be formed of the median x-component and the median y-component subject to each probe heading vector being first being normalized to a fixed length, e.g., 1.

Also, one property of the median that the median of an even number of values is the average of the two middle values after the sorting operation. The median probe heading vector is determined in accordance with one embodiment in order to avoid this scenario in which the two middle values are averaged. This is because if the probe heading vector for the median includes probes from both direction of travel and if the number of probes is an even number, the resulting median heading vector that is the average of the two middle values may be perpendicular to the road. Therefore, in the instance in which there is an even number of probe heading vectors, one probe heading vector may be eliminated to obtain an odd number of probe heading vectors from which to compute the median heading, thereby insuring that the resulting median heading vector will point in one of the two driving directions.

In an example in which the roadway geometry shape is already known, $\gamma^x$ is the road segment heading direction vector. For example, a first derivative of the road is a differentiable curve like a spline, but can also be estimated from a polyline. In order to compute the parking likelihood $\mathcal{L} \in [0,1]$, vehicle probe data of driving vehicles is established and distinguished from vehicle probe data of parked vehicles, as described above with respect to heading density related to parking and heading density related to driving. The parking likelihood may then be estimated according to the following:

$$\mathcal{L} = \frac{HD_P}{HD_D + HD_P} \quad (1)$$

wherein $HD_P$ is the probe heading density representing vehicle behavior while parking or when parked, and $HD_D$ is the probe heading density representing vehicle behavior while driving. As such, the parking likelihood may be determined based upon a ratio of the probe heading parking density to a combination of the probe heading driving density and the probe heading parking density, one example of which is provided above.

Since GPS data gathered while a probe is slow or stationary may be noisy, the probe heading driving density $HD_D$ may not only require that the probe data points of a respective grid cell have a heading within a first predefined range $[-\theta, +\theta]$ about the local heading direction $\gamma^x$ of the road, but also that the probe data points have a speed that is at least as great as a predefined minimum speed. As such, slow moving probes (e.g., probes with speed less than 5 kilometers per hour (kph)) may be excluded when computing a road (or driving) probe heading density $HD_D$. This also applies for parking lanes, which may represent lanes in a parking lot where vehicles may drive in uniform directions at speeds exceeding 5 kph. When computing probe heading density for parking $HD_p$, low and zero-speed probe data points are explicitly included as they may represent vehicle behavior while the vehicle is performing parking maneuvers and while it is parked. Thus, the probe heading parking density is based upon probe data points that are associated with a respective grid cell and that have a heading outside of the first predefined range about the local heading direction $\gamma^x$ of the road, such as a heading within a second predefined range about a line perpendicular to the local heading direction $\gamma^x$ of the road, and that also have a speed that is no greater than the predefined maximum speed. Although the predefined minimum speed for the probe heading driving density and the predefined maximum speed for the probe heading parking density may be the same, they may have different values in other embodiments. Likewise, the first and second predefined ranges may be the same or different in various embodiments.

While the focus of certain embodiments described herein is probe data points representing vehicles, both driving and parking/parked, probe data from mobile devices 14 that are not associated with or no longer associated with vehicles, such as mobile phones, may generate probe data points while a user is in a building, which may resemble parking related probe data. Indoor probes are almost exclusively low speed probes such that a speed ratio $SR \in [0,1]$ may be derived to identify indoor probes for exclusion from the determination of the probe heading parking density and the probe heading driving density. The mapping system 10 includes means, such as the processing circuitry 20, the processor 22 or the like configured to determine the parking likelihood by determining a speed ratio of probe data points having a speed that is at least as great as a predefined minimum speed to a combination of probe data points having a speed that is at least as great as a predefined minimum speed and probe data points having a speed that is no more than a predefined maximum speed. For example, the speed ratio may be defined as follows:

$$SR = \frac{HD_{NLS}}{HD_{LS} + HD_{NLS}} \quad (2)$$

wherein $HD_{NLS}$ represents the heading density of non-low speed probes (e.g., probes with speed greater than a predefined minimum speed, for example, 5 kph) and $HD_{LS}$ represents low speed probes (e.g., speeds of no more than a predefined maximum speed, such as between 0 and 5 kph). Thus, if the location contains almost exclusively low speed probes yielding a low value for SR, that is a value for SR that is less than a predetermined value (e.g., SR<0.1), it is likely an indoor location. Although the predefined minimum and maximum speeds may be the same value, the predefined minimum and maximum speeds may be different in other embodiments. In such an instance, the mapping system 10 includes means, such as the processing circuitry 20, the processor 22 or the like, that are also configured to determine the parking likelihood by setting the parking likelihood to a value that fails to satisfy the predefined threshold, such as by setting the parking likelihood to zero. Thus, the parking likelihood will indicate that the probe data points for the respective grid cell should not be considered to represent parking behavior, notwithstanding their relatively low speed and potentially chaotic headings.

As shown in block 44 of FIG. 3, the mapping system 10 also includes means, such as the processing circuitry 20, the processor 22 or the like, configured to identify likely parking locations in instances in which the parking likelihood for a respective grid cell satisfies a predefined threshold. Although the predefined threshold may be defined in various manners, such as by being user-defined or variable based on machine learning with actual parking likelihoods based on vehicle probe data, the predefined threshold that must be satisfied by the parking likelihood in order for the grid cell to be considered a likely parking location is 0.7 in one embodiment. With reference now to FIG. 5, grid cells having a parking likelihood that are determined to satisfy the predefined threshold and that are therefore considered likely parking locations are illustrated with a dot 64, e.g., a blue dot, located at the center of the respective grid cells. In this regard, FIG. 5 includes a legend along the left hand side indicating a range of parking likelihoods ranging from 0.000 to 0.987. The parking likelihood may be visually distinguished and communicated via a gray scale with higher likelihood of parking approaching dark gray, while a lower parking likelihood is represented by a lighter gray. In the illustrated embodiment, a predefined threshold of 0.7 has been applied such that dots 64 are displayed at the center of only those grid cells having a parking likelihood data exceeds the predefined threshold of 0.7. It is noted that FIG. 5 was created prior to application of the speed ratio SR, which would have eliminated some of the likely parking locations that are located within buildings or other structures.

Some parking likelihood data may be erroneous due to, for example, GPS error or probe data emanating from pedestrians. The erroneous points of FIG. 5 may be inside the footprint of a building as shown in the map view. In some embodiments, the map database 18 may include data indicating the footprint of a building or the footprint of some other point of interest where there would not be parking availability. In such embodiments, parking likelihood calculations that are within such building or point of interest footprints may be excluded as erroneous.

As shown in block 46 of FIG. 3, the mapping system 10 also includes means, such as processing circuitry 20, the processor 20 or the like, configured to cluster likely parking locations to identify parking lot clusters. The clustering of likely parking locations may be performed in various manners including by application of a mean shift technique or a median shift technique to the likely parking locations in order to find a weighted center of mass of the likely parking locations. By way of example, mean shift is a non-parametric feature—analysis technique to locate the maxima of a density function and may be mathematically represented in an instance in which each cell location $X_i$ is weighted by the parking likelihood $\mathcal{L}_i$ for the respective cell i as follows: $x_{(k+1)} = \mu(x_{(k)})$ where $$\mu(x) = \frac{\sum_{i=0}^{n} K_H(X_i - x) X_i \mathcal{L}_i}{\sum_{i=0}^{n} K_H(X_i - x) \mathcal{L}_i}$$

and the mean shift is iteratively repeated until x converges to a constant or at least until x changes from one iteration to the next by less than a predefined threshold. In the foregoing equation, $X_i$ is the cell center location $(x_i, y_i)$, x is the current mean center from the previous iteration, $K_H(\cdot)$ is a Gaussian kernel function $$K_H(\cdot) = e^{-\frac{1}{2}\left(\frac{X_i - x}{b}\right)^2}$$

that serves as a weighting function and h is the bandwidth. In one embodiment, the bandwidth h is the search radius, such as 30 meters for 10 meter×10 meter grid cells. By including the parking likelihood $\mathcal{L}_i$, cells with higher parking likelihood values will contribute more to the mean shift and result in a more precise estimation of the cluster center. The stable weighted center of mass around point x may also be referenced as $\mu^x$.

Although the mean shift is computed in an example embodiment for each x, y component separately as noted above, the mean shift for each x, y component may be separately computed the same iterative loop, such as shown in the following:

$$\mu(x_{(k+1)}) = \frac{\sum_{i=0}^{n} K_H(x_i - \mu(x_{(k)})) x_i \mathcal{L}_i}{\sum_{i=0}^{n} K_H(x_i - \mu(x_{(k)})) \mathcal{L}_i}$$

$$\mu(y_{(k+1)}) = \frac{\sum_{i=0}^{n} K_H(y_i - \mu(y_{(k)})) y_i \mathcal{L}_i}{\sum_{i=0}^{n} K_H(y_i - \mu(y_{(k)})) \mathcal{L}_i}$$

Although the weighting is performed using a Gaussian kernel function in the foregoing example, other kernels may be utilized in order to perform different weighting including, for example, a uniform convolution kernel, an Epanechnikov convolution kernel or a biweight convolution kernel. The interactive computation of the weighted center of mass of the likely parking locations is repeated until the weighted center of mass converges, that is, until the change in location of the weighted center of mass from $x_i$ to $x_{i+1}$ is less than a predefined threshold.

In order to determine clusters of likely parking locations and, more particularly, to determine the centers of the clusters of likely parking locations, the mapping system 10, such as the processing circuitry 20, the processor 22 or the like, initially separates the likely parking locations into respective grid cells. In one embodiment, although the likely parking locations may be separated into the same grid cells as described below, only those grid cells having a parking likelihood that satisfies a predefined threshold may be iterated over in order to determine clusters of likely parking locations. As before, the grid cells may have various sizes and shapes, but, in one embodiment, are squares having a side of a predefined length, e.g., 10 meters. For each grid cell that includes a likely parking location, that is, for each grid cell having a parking likelihood that satisfies a predefined threshold, the mapping system 10, such as the processing circuitry 20, the processor 22 or the like, initiates the mean shift at the center of the respective grid cell. For each grid cell, the mapping system 10, such as the processing circuitry 20, the processor 22 or the like, applies the mean shift by iterating over the likely parking locations until the center of the likely parking locations does not move at all or the movement is less than some small distance such as 0.1 meters. Once the center of the likely parking locations has stabilized, the center will be considered to represent the cluster of likely parking locations considered during the mean shift technique for a respective grid cell.

In this regard, mean shift is an iterative gradient-based technique that seeks to iterate toward the highest density peak. With respect to parking likelihoods, the density value is the value of the parking likelihood $x_i$. As such, for each grid cell having a parking likelihood that satisfies a predefined threshold, the mapping system 10, such as the processing circuitry 20, the processor 22 or the like, determines the center of mass $\mu(x)$, e.g., the weighted center of mass, for the grid cells having a parking likelihood that satisfies the predefined threshold that are within a search radius, e.g., bandwidth h such as 30 meters, as described above. The mapping system, such as the processing circuitry 20, the processor 22 or the like, then repeats the determination of the center of mass $\mu(x)$, albeit about the location determined for the center of mass $\mu(x)$ from the immediately prior iteration. This iterative process is repeated until the center of mass $\mu(x)$ moves less than a predefined amount, e.g., less than 0.1 meters, from one iteration to the next, at which point the center of mass $\mu(x)$ has converged and the iterative process is halted.

Since the cluster search is initiated from each grid cell, more than one grid cell may iterate to the same parking cluster center. This functionality is enabled by using a cluster center merge threshold to allow the center determined pursuant to the mean shift technique for subsequently considered grid cells to snap to an existing cluster center determined for previously considered grid cells if the centers are within the merge threshold, such as within 10 meters of one another. Additionally, the mapping system 10, such as the processing circuitry 20, the processor 22 or the like, of an example embodiment may require a final cluster to have a minimum number of likely parking locations and/or a minimal shape extent, e.g., at least a minimum length of its principal axes as determined, for example, by PCA, a minimum circumference and/or a minimum surface area. With respect to the requirement that the principal axes have at least a minimum length, the shape of the cluster may be defined and clusters that may be determined not to be parking lots as a result of their shape may be excluded. For example, the street parking in which vehicles are parked at a diagonal to the road may be recognized from a shape of the cluster that is long and narrow along the road and/or on opposite sides of the road. Additionally, the minimum circumference and/or the minimum surface area may be utilized to classify the parking clusters into different types of parking lots or to exclude certain clusters. Also, the final shape and area of a polygon representative of a parking lot in combination with the driving paths through a parking lot may permit the number of parking spaces to be estimated. Moreover, clusters that do not satisfy the minimum circumference and/or the minimum surface area requirements may, in some embodiments, be considered too small to be depicted on a map, such as in instances in which a cluster has a size smaller than the minimum size requirement for a point of interest to be depicted on a map.

By way of example of the clustering of likely parking locations, FIG. 6 depicts the centers of respective clusters of likely parking locations with a dot 66. As will be apparent by comparison of the likely parking locations of FIG. 5 represented by dots 64 and the much smaller number of clusters of likely parking locations represented by dots 66 in FIG. 6, the plurality of likely parking locations have been clustered as described above into a much smaller number of clusters of likely parking locations, the center of each of which is represented by a dot 66 in FIG. 6. As a point of comparison, the more lightly shaded dots in FIG. 6 represent the underlying probe data points.

As shown in block 48 of FIG. 3, the mapping system 10 of an example embodiment also includes means, such as the processing circuitry 20, the processor 22 or the like, configured to determine the boundary of a parking lot pursuant to a deformable contour model which causes a polygon to expand from a respective parking lot cluster to represent the boundary of the parking lot. In this regard, the polygon that represents the boundary of the parking lot is expanded from the center of the respective cluster utilizing the deformable contour model. The placement and shape of a deformable contour is determined by an energy function:

$$E_{total} = E_{internal} + E_{external}$$

wherein the internal energy $E_{internal}$ controls the shape of the contour, such as the smoothness, elasticity and/or adherence to some prior shape, while the external energy $E_{external}$ encourages the contour to conform to, e.g., snap to, a certain feature, such as a parking lot boundary.

The internal energy may be formed of a combination of bending energy and tension energy. Bending energy in a continuous contour curve, such as a spline p(u), can be expressed as the integral over the curve extent Ω as follows:

$$E_{bending} = \int_\Omega \left(\frac{\partial^2 p(u)}{\partial u^2}\right)^2 du$$

Also, the tension energy in a continuous contour of a spline curve can be expressed as the integral over the curve extent Ω as follows:

$$E_{tension} = \int_\Omega \left(\frac{\partial p(u)}{\partial u}\right)^2 du$$

As such, the total internal energy can be expressed as a weighted sum of the bending and tension energy as follows:

$$E_{internal} = \alpha E_{bending} + \beta E_{tension} = \alpha \int_\Omega \left(\frac{\partial^2 p(u)}{\partial u^2}\right)^2 du + \beta \int_\Omega \left(\frac{\partial p(u)}{\partial u}\right)^2 du$$

wherein the weights (α, β) control the bending energy and the tension energy, respectively, and may be predefined, determined experimentally or the like. In order to represent the boundary of a parking lot, the boundary curve Ω is represented as a closed polygon curve C with n vertices $v_i(x_i, y_i)$ as follows:

$$C = \sum_{i=1}^{n} v_i.$$

The discrete representations of the partial derivatives can be approximated as follows:

$$\frac{\partial p(u)}{\partial u} \approx v_{i+1} - v_i$$

$$\frac{\partial^2 p(u)}{\partial u^2} \approx (v_{i+1} - v_i) - (v_i + v_{i-1}) = v_{i+1} - 2v_i + v_{i-1}$$

As such, the internal energy may be redefined as an approximation of the integrals of the partial derivatives expressing the internal energy as follows:

$$E_{internal} - \alpha \sum_{i=1}^{n} \|v_{i+1} - v_i\|^2 + \beta \sum_{i=1}^{n} \|v_{i+1} - 2v_i + v_{i-1}\|^2 - \sum_{i=1}^{n} \alpha \|v_{i+1} - v_i\|^2 + \beta \|v_{i-1} - 2v_i + v_{i-1}\|^2$$

While described above with respect to the determination of the internal energy for a continuous curve, the internal energy may also be determined for a discrete curve comprised of a plurality of polylines joined at vertices.

The external energy of a deformable contour may be modeled in various manners, such as by using gradient-based edge energy, edge-based energy and/or region-based energy. The external energy is based upon detection of the boundary of the parking lot with the external energy function of one embodiment being configured so as to attain a minimum value when each vertex is located on the edge of the parking boundary. By way of example, the external energy is modeled as a region-based energy variant based on a number of likely parking locations $P_{HL}$ outside of the contour C within some perpendicular boundary H as follows:

$$E_{external} = \sum_{H} p_{HL}.$$

In other words, the external energy function of an example embodiment is based upon a number of likely parking locations outside of the boundary within a predefined distance of the boundary, such as a predefined distance H measured in a direction perpendicular to the local boundary. Once no such likely parking locations remain, or only a few remain, outside the contour and near a vertex, the expansion of the boundary is complete and the boundary is fixed in position. As the contour expands outwardly, the internal likely parking locations need not be reconsidered. Additionally, the mapping system 10, such as the processing circuitry 20, the processor 22 or the like, may be configured to weight the external energy function by the perpendicular distance from the contour C to each likely parking location $P_{HL}$ outside of the contour C. While the external energy function may be weighted in various manners, a Gaussian kernel function $$K_H(\cdot) = e^{-\frac{1}{2}\left(\frac{(d_i)}{h}\right)^2}$$

may be utilized in which $d_i$ is a perpendicular distance from the contour boundary to the likely parking location i and h is the bandwidth which is the perpendicular region distance H to the boundary of the contour C. The weighting may be performed such that the likely parking locations that are closer to the boundary are weighted more greatly and, therefore, contribute more significantly to the definition of the boundary than the likely parking locations further from the boundary. As such, the external energy is defined as follows:

$$E_{external} = \sum_H e^{\frac{1}{2}\left(\frac{(d_i)}{h}\right)^2}$$

In order to define the resulting boundary, the energy function $E_{total}$ may be minimized, such as with an energy minimization methodology, such as a gradient descent algorithm, a greedy search algorithm or dynamic programming algorithms. Gradient descent is a technique to minimize an objective function $J(\theta)$ parameterized by a model's parameters $\theta$ by updating the parameters to move in the opposite direction of the gradient of the objective function $\nabla J(\theta)$ with respect to the parameters. Thus, minimizing the total $E_{total}$ using gradient decent involves computing the gradient of the total energy $E_{total}$ expression with respect to the boundary vertex locations in each iteration and moving in the direction of the negative gradient until a minimum energy is obtained.

As another example, dynamic programming algorithms examine previously solved sub-problems and combine their solutions to give the best solution for the given problem. Dynamic programming can be applied to minimizing the total $E_{total}$ by considering a discrete local neighborhood around each vertex, such as a local grid and solving each local neighborhood as a sub-problem by finding the optimal grid location for each vertex. Since the local energy expression $E_i$ for each vertex $v_i$ depends on the position of adjacent vertices $v_{i+1}$, $v_{i-1}$, the problem becomes a state transition graph optimization problem where the optimal position, that is, state, for each vertex can be solved using algorithms such as a Viterbi algorithm or a shortest path algorithm where graph edges found to be sub-optimal are discarded.

Another example of an optimization algorithm is the greedy algorithm which treats the solution as some sequence of steps and picks the locally optimal choice at each step. However, the greedy algorithm does not guarantee convergence to the global minimum of the energy function.

When employing such energy minimization techniques, the initial contour is initialized by a small polygon circle around the cluster center. Depending on the initial number of boundary vertices, additional vertices may optionally be inserted as the boundary expands to maintain sufficient shape fidelity of the contour. The external energy term will attempt to locally expand the contour as long as there are high likelihood parking locations on the outside of the boundary near that vertex. When the contour boundary only includes a few or no high likelihood parking locations near a vertex, the external energy term decreases and the internal energy term will fine-tune the shape of the contour. As such, the polygon that has expanded from a respective parking lot cluster pursuant to the deformable contour model represents the boundary of the parking lot. As an alternative, an analytical boundary curve, such as e.g. a closed B-spline, may be employed where the control points and knots are optimized by the energy minimization technique.

The shape of the parking lot contour may also be subject to additional constraints. For example, since parking lots typically exhibit regular polygonal shapes, the final shape of the contour may be approximated by more regularly shaped polygons. Further, when building footprints are available, parts of the parking lot contour may be constrained or adjusted to be parallel to edges of building footprints and/or adjacent roads.

As shown in block 50 of FIG. 3, the mapping system 10 of an example embodiment also includes means, such as the processing circuitry 20, the processor 22 or the like, configured to merge parking lots having respective boundaries that overlap. In this regard, the mapping system 10, such as the processing circuitry 20, the processor 22 or the like, is configured to identify parking lots for which the boundaries overlap one another. In an instance in which adjacent parking lots have boundaries that overlap one another, the mapping system 10, such as the processing circuitry 20, the processor 22 or the like, is configured to combine the two or more parking lots into a single parking lot and to redefine the boundary of the resulting parking lot to extend about the paraphry of the combined parking lots.

As shown in block 52 of FIG. 3, the mapping system 10 also includes means, such as the processoring circuitry 20, the processor 20 or the like, configured to update a map to include the parking lot having the boundary determine pursuant to the deformable contour model. See, for example, FIG. 7 in which the parking lot boundary 68 about each cluster 66 is depicted. As such, the map data 18 may be updated by the processing circuitry 20 so as to identify a parking lot and to define the boundary 68 of the parking lot. Thereafter, upon display of the map, such as by navigation system, the parking lot may be identified and the boundary 68 may be depicted. As such, a user of the navigation system may have a clearer image of the relative location of the parking lot and the size and shape of the parking lot so as to facilitate the location of the parking lot and the driver's entry therein.

FIG. 3 illustrates a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of a mapping system 10 employing an embodiment of the present invention and executed by processing circuitry 20, such as processor 22, of the mapping system. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A mapping system for identifying a parking lot from probe data, the mapping system comprising:
    a non-transitory memory configured to store the probe data comprised of a plurality of probe data points, each of the plurality of probe data points associated with a respective location; and
    processing circuitry in communication with the memory and configured to associate the plurality of probe data points with respective grid cells based upon the location associated with each probe data point,
    wherein the processing circuitry is configured to determine a parking likelihood for each grid cell based upon the probe data points associated with the respective grid cells and to identify likely parking locations in instances in which the parking likelihood for a respective grid cell satisfies a predefined threshold,
    wherein the processing circuitry is also configured to cluster the likely parking locations to identify parking lot clusters,
    wherein the processing circuitry is also configured to determine a boundary of the parking lot pursuant to a deformable contour model which causes a polygon, which is relatively centered to a respective parking lot cluster of the identified parking lot clusters, to expand to represent the boundary of the parking lot, and
    wherein the processing circuitry is further configured to update a map to include the parking lot having the boundary determined pursuant to the deformable contour model.

2. The mapping system according to claim 1 wherein the processing circuitry is further configured to merge parking lots having respective boundaries that overlap.

3. The mapping system according to claim 1 wherein the processing circuitry is configured to determine the boundary of the parking lot based upon an energy function comprised of an external energy function and an internal energy function, wherein the internal energy function is based upon a bending energy and a tension energy determined from one or more vertices of the boundary, and wherein the external energy function is based upon detection of the boundary of the parking lot.

4. The mapping system according to claim 1 wherein the processing circuitry is configured to determine the parking likelihood for a respective grid cell by determining a local heading direction of a road and then determining a probe heading driving density based upon a number of probe data points that are associated with the respective grid cell that have a heading within a first predefined range of the local heading direction of the road and that also have a speed that is at least as great as a predefined minimum speed.

5. The mapping system according to claim 4 wherein the processing circuitry is further configured to determine the parking likelihood for a respective grid cell by determining a probe heading parking density based upon a number of probe data points that are associated with the respective grid cell that have a heading with a second predefined range and that also have a speed that is no greater than a predefined maximum speed.

6. The mapping system according to claim 5 wherein the processing circuitry is further configured to determine the parking likelihood for a respective grid cell based upon a ratio of the probe heading parking density to a combination of the probe heading driving density and the probe heading parking density.

7. The mapping system according to claim 5 wherein the processing circuitry is further configured to determine the parking likelihood by: (i) determining a speed ratio of probe data points having a speed that is at least as great as a predefined minimum speed to a combination of probe data points having a speed that is at least as great as the predefined minimum speed and probe data points having a speed that is no more than a predefined maximum speed and (ii) setting the parking likelihood to a value that fails to satisfy the predefined threshold in an instance in which the speed ratio is less than a predetermined value.

8. A method for identifying a parking lot from probe data comprised of a plurality of probe data points, the method comprising:
    associating the plurality of probe data points with respective grid cells based upon a location associated with each of the plurality of probe data points;
    determining a parking likelihood for each grid cell based upon the probe data points associated with the respective grid cells;
    identifying likely parking locations in instances in which the parking likelihood for a respective grid cell satisfies a predefined threshold;
    clustering the likely parking locations to identify parking lot clusters;
    determining, with processing circuitry of a mapping system, a boundary of the parking lot pursuant to a deformable contour model which causes a polygon, which is relatively centered to a respective parking lot cluster of the identified parking lot clusters, to expand to represent the boundary of the parking lot; and updating a map to include the parking lot having the boundary determined pursuant to the deformable contour model.

9. The method according to claim 8 further comprising merging parking lots having respective boundaries that overlap.

10. The method according to claim 8 wherein determining the boundary of the parking lot is based upon an energy function comprised of an external energy function and an internal energy function, wherein the internal energy function is based upon a bending energy and a tension energy determined from one or more vertices of the boundary, and wherein the external energy function is based upon detection of the boundary of the parking lot.

11. The method according to claim 8 wherein determining the parking likelihood for a respective grid cell comprises determining a local heading direction of a road and then determining a probe heading driving density based upon a number of probe data points that are associated with the respective grid cell that have a heading within a first predefined range of the local heading direction of the road and that also have a speed that is at least as great as a predefined minimum speed.

12. The method according to claim 11 wherein determining the parking likelihood for a respective grid cell comprises determining a probe heading parking density based upon a number of probe data points that are associated with the respective grid cell that have a heading within a second predefined range and that also have a speed that is no greater than the predefined maximum speed.

13. The method according to claim 12 wherein determining the parking likelihood for a respective grid cell is based upon a ratio of the probe heading parking density to a combination of the probe heading driving density and the probe heading parking density.

14. The method according to claim 12 wherein determining the parking likelihood comprises:
   determining a speed ratio of probe data points having a speed that is at least as great as a predefined minimum speed to a combination of probe data points having a speed that is at least as great as the predefined minimum speed and probe data points having a speed that is no more than a predefined maximum speed; and
   setting the parking likelihood to a value that fails to satisfy the predefined threshold in an instance in which the speed ratio is less than a predetermined value.

15. A computer program product for identifying a parking lot from probe data comprised of a plurality of probe data points, the computer program product comprising at least one non-transitory computer-readable storage medium having computer-executable program code portions stored therein, the computer-executable program code portions comprising program code instructions configured to:
   associate the plurality of probe data points with respective grid cells based upon a location associated with each of the plurality of probe data points;
   determine a parking likelihood for each grid cell based upon the probe data points associated with the respective grid cells;
   identify likely parking locations in instances in which the parking likelihood for a respective grid cell satisfies a predefined threshold;
   cluster the likely parking locations to identify parking lot clusters;
   determine a boundary of the parking lot pursuant to a deformable contour model which causes a polygon, which is relatively centered to a respective parking lot cluster of the identified parking lot clusters, to expand to represent the boundary of the parking lot; and
   update a map to include the parking lot having the boundary determined pursuant to the deformable contour model.

16. The computer program product according to claim 15 wherein the computer-executable program code portions further comprise program code instructions configured to merge parking lots having respective boundaries that overlap.

17. The computer program product according to claim 15 wherein the program code instructions configured to determine the boundary of the parking lot comprise program code instructions configured to determine the boundary of the parking lot based upon an energy function comprised of an external energy function and an internal energy function, wherein the internal energy function is based upon a bending energy and a tension energy determined from one or more vertices of the boundary, and wherein the external energy function is based upon detection of the boundary of the parking lot.

18. The computer program product according to claim 15 wherein the program code instructions configured to determine the parking likelihood for a respective grid cell comprise program code instructions configured to determine a local heading direction of a road and program code instructions configured to then determine a probe heading driving density based upon a number of probe data points that are associated with the respective grid cell that have a heading within a first predefined range of the local heading direction of the road and that also have a speed that is at least as great as a predefined minimum speed.

19. The computer program product according to claim 18 wherein the program code instructions configured to determine the parking likelihood for a respective grid cell comprise program code instructions configured to determine a probe heading parking density based upon a number of probe data points that are associated with the respective grid cell that have a heading within a second predefined range and that also have a speed that is no greater than the predefined maximum speed.

20. The computer program product according to claim 18 wherein the program code instructions configured to determine the parking likelihood comprise the program code instructions configured to:
   determine a speed ratio of probe data points having a speed that is at least as great as a predefined minimum speed to a combination of probe data points having a speed that is at least as great as the predefined minimum speed and probe data points having a speed that is no more than a predefined maximum speed; and
   set the parking likelihood to a value that fails to satisfy the predefined threshold in an instance in which the speed ratio is less than a predetermined value.

* * * * *